US012663985B2

(12) United States Patent
Jordan

(10) Patent No.: US 12,663,985 B2
(45) Date of Patent: Jun. 23, 2026

(54) FINGERPRINT INFERENCE OF SOFTWARE ARTIFACTS

(71) Applicant: Oracle International Corporation, Redwood Shores, CA (US)

(72) Inventor: Alexander Jordan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 346 days.

(21) Appl. No.: 17/944,975

(22) Filed: Sep. 14, 2022

(65) Prior Publication Data

US 2024/0086185 A1     Mar. 14, 2024

(51) Int. Cl.
*G06F 9/445* (2018.01)
*G06F 8/71* (2018.01)

(52) U.S. Cl.
CPC ..................................... *G06F 8/71* (2013.01)

(58) Field of Classification Search
CPC ... G06F 8/71; G06F 16/23; G06F 8/65; G06F 8/61; G06F 8/60; G06F 8/36; G06F 8/658; G06F 8/77; G06F 16/9014; G06F 16/9566; G06F 16/35; G06F 16/232; G06N 20/00; G06N 7/01; G06N 3/126; G06N 3/02; G06N 3/042
USPC .................................................. 717/107–120
See application file for complete search history.

(56) References Cited

U.S. PATENT DOCUMENTS

2002/0198873 A1* 12/2002 Chu-Carroll .............. G06F 8/36
2011/0320479 A1* 12/2011 Burris ................... G06F 16/245
707/769

OTHER PUBLICATIONS

Backes, M. et al., "Reliable Third-Party Library Detection in Android and its Security Applications", Proceedings of the 2016 ACM SIGSAC Conference on Computer and Communications Security; Oct. 2016, pp. 356-367 (12 pages).
(Continued)

*Primary Examiner* — Chuck O Kendall
(74) *Attorney, Agent, or Firm* — Lathrop GPM LLP

(57) ABSTRACT

Fingerprint inference of software artifacts includes receiving a request including classes, generating request fingerprints from the classes, and querying at least one index with the request fingerprints to identify a matching set of artifact versions. Fingerprint inference further includes obtaining, for each matching artifact version in the matching set of artifact versions, a count of the request fingerprints matching a indexed fingerprint related, in the at least one index, to the artifact version, and selecting a subset of the matching set of artifact versions having a count that is maximal amongst the matching set of artifact versions. Fingerprint inference further includes returning the subset of the matching set of artifact versions.

20 Claims, 6 Drawing Sheets

(56)          References Cited

OTHER PUBLICATIONS

Duan, R. et al., "Identifying Open-Source License Violation and 1-day Security Risk at Large Scale", Proceedings of the 2017 ACM SIGSAC Conference on Computer and Communications Security; Oct. 2017, pp. 2169-2185 (17 pages).

Haq, I. U. et al., "A Survey of Binary Code Similarity", ACM Computing Surveys, vol. 54, Issue 3, Jun. 2021, pp. 1-38 (38 pages).

Zhan, X. et al., "A Systematic Assessment on Android Third-party Library Detection Tools", IEEE Transactions on Software Engineering, Aug. 4, 2021 (25 pages).

Zhan, X. et al., "ATVHunter: Reliable Version Detection of Third-Party Libraries for Vulnerability Identification in Android Applications", 2021 IEEE/ACM 43rd International Conference on Software Engineering (ICSE), May 2021, pp. 1695-1707 (13 pages).

* cited by examiner

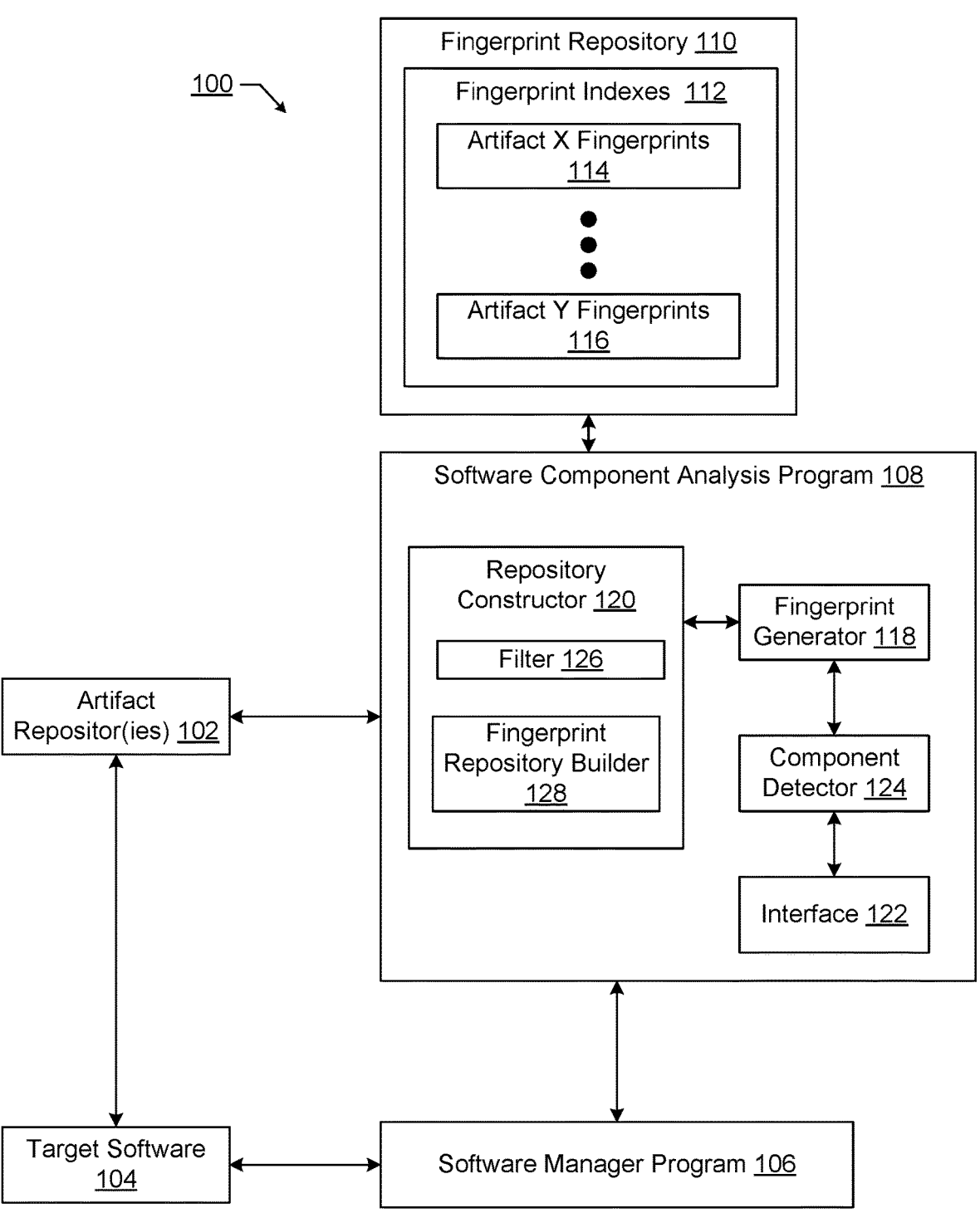
_FIG. 1_

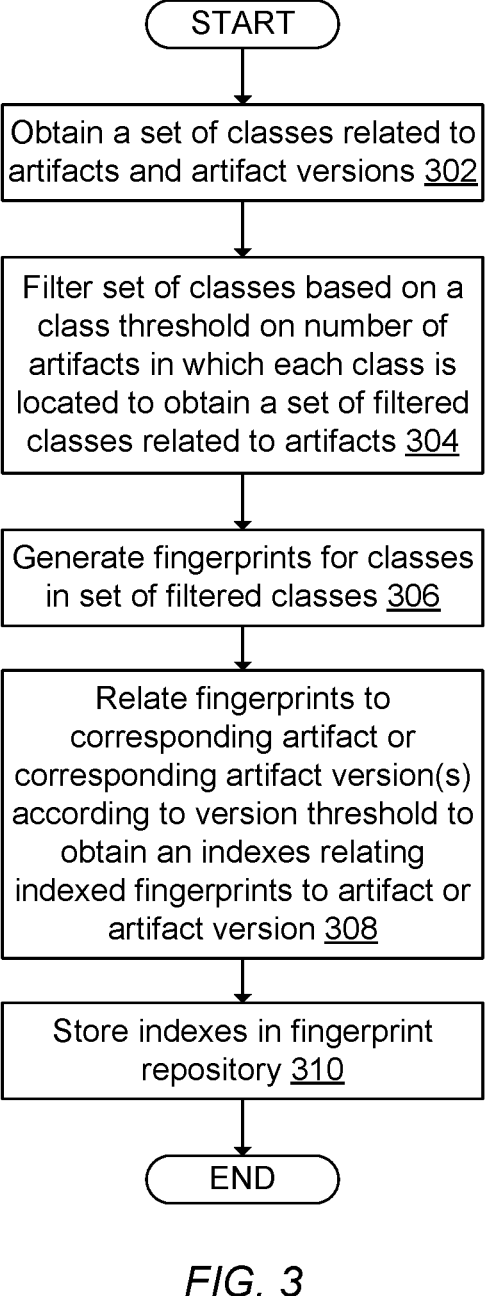

START

Obtain a set of classes related to artifacts and artifact versions 302

Filter set of classes based on a class threshold on number of artifacts in which each class is located to obtain a set of filtered classes related to artifacts 304

Generate fingerprints for classes in set of filtered classes 306

Relate fingerprints to corresponding artifact or corresponding artifact version(s) according to version threshold to obtain an indexes relating indexed fingerprints to artifact or artifact version 308

Store indexes in fingerprint repository 310

END

*FIG. 3*

600
Computing
System

608
Output Device(s)

604
Non-Persistent
Storage

602
Computer
Processor(s)

606
Persistent
Storage

612
Communication
Interface

610
Input Device(s)

620
Network

622
Node X

624
Node Y

626
Client Device

FINGERPRINT INFERENCE OF SOFTWARE ARTIFACTS

BACKGROUND

Software development includes developers writing new source code that uses libraries. After creating the source code, the source code may be compiled and linked with the libraries to create bytecode (binary code) that is the executable software. The binary code may be made up of smaller components such as object files, modules, or classes. At this stage, the bytecode is not easily readable by a human.

For large software projects, many libraries and library versions may be used in a single software project. Further, the libraries and library versions may change over time as new versions of the software is created. Similarly, multiple developers may modify the software code on an ad hoc and dynamic basis. The above aspects of software development may cause challenges in tracking the libraries and library versions that are in the software. Correspondingly, challenges may exist in determining whether security vulnerabilities exist in the software because of the libraries, determining whether outdated versions or libraries are used, or performing other analysis.

SUMMARY

In general, in one aspect, one or more embodiments relate to a method that includes receiving a request including classes, generating request fingerprints from the classes, and querying at least one index with the request fingerprints to identify a matching set of artifact versions. The method further includes obtaining, for each matching artifact version in the matching set of artifact versions, a count of the request fingerprints matching a indexed fingerprint related, in the at least one index, to the artifact version, and selecting a subset of the matching set of artifact versions having a count that is maximal amongst the matching set of artifact versions. The method further includes returning the subset of the matching set of artifact versions.

In general, in one aspect, one or more embodiments relate to a system that includes a fingerprint repository comprising at least one index, and a software component analysis program executing on a computer processor. The software component analysis program includes an interface for receiving a first request comprising a first plurality of classes, and returning a subset of a first matching set of artifact versions. The software component analysis program further includes a fingerprint generator for generating a first plurality of request fingerprints from the first plurality of classes, and a component detector. The component detector is for querying at least one index in the fingerprint repository with the first plurality of request fingerprints to identify the first matching set of artifact versions, obtaining, for each matching artifact version in the first matching set of artifact versions, a count of the first plurality of request fingerprints matching an indexed fingerprint related, in the at least one index, to the artifact version, and selecting the subset of the first matching set of artifact versions having a count that is maximal amongst the first matching set of artifact versions.

In general, in one aspect, one or more embodiments relate to a non-transitory computer readable medium comprising computer readable program code for causing a computing system to perform operations. The operations include receiving a request including classes, generating request fingerprints from the classes, and querying at least one index with the request fingerprints to identify a matching set of artifact versions. The operations further include obtaining, for each matching artifact version in the matching set of artifact versions, a count of the request fingerprints matching a indexed fingerprint related, in the at least one index, to the artifact version, and selecting a subset of the matching set of artifact versions having a count that is maximal amongst the matching set of artifact versions. The operations further include returning the subset of the matching set of artifact versions.

Other aspects of the invention will be apparent from the following description and the appended claims.

BRIEF DESCRIPTION OF DRAWINGS

FIG. 1 is a diagram of a system in accordance with one or more embodiments.

FIG. 3 is a flowchart for storing fingerprints in a fingerprint repository in accordance with one or more embodiments.

Like elements in the various figures are denoted by like reference numerals for consistency.

DETAILED DESCRIPTION

Figure 2:
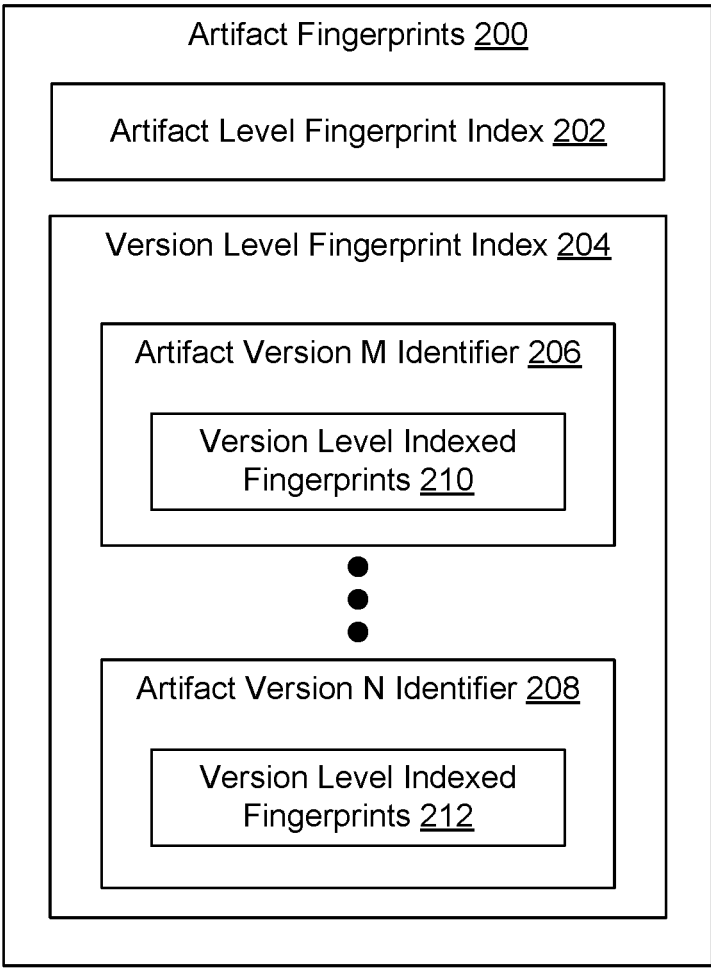
FIG. 2 is a diagram of a fingerprint repository in accordance with one or more embodiments.

In general, embodiments are directed to tracking software artifacts in a target software based on fingerprints of classes used in the artifacts. Generally, an artifact is a software project that may be linked to the target software. An example of an artifact is a library. Artifacts have classes (i.e., software classes). One or more of the classes may be part of the binary code of the target software. Multiple versions of the artifact may exist. Different artifacts may have the same classes as other artifacts. Further, different versions of artifacts may have some of the same classes, new classes, or modifications to a class. Thus, matching fingerprints of a class may not directly identify the artifact and artifact version.

One or more embodiments create an index of fingerprints of classes to artifacts and artifact versions. The index is created such that common classes are ignored and do not have a fingerprint in the index. Thus, to identify the artifact version that corresponds to the classes, a query is performed with the fingerprints to identify matching set of artifact versions. For each artifact version, a count is obtained of the number of matching fingerprints in the index. The subset having one or more artifact versions that have a maximal count is identified and selected as being in the target code.

Further, in at least some embodiments, the index is defined at multiple levels of granularity. Some classes that do not identify the particular artifact version may be used to identify the artifact. Thus, to accommodate those classes, two tiers of index exist. The first tier identifies the artifact, and the second tier identifies the artifact version. By having two tiers of granularity, when the artifact version cannot be determined, the artifact may be determined and used in further analysis.

Turning to the Figures, FIG. 1 shows a diagram of a system in accordance with one or more embodiments. As shown in FIG. 1, the system (100) includes or is connected to one or more artifact repositories (102). In general, a repository is any type of storage unit and/or device (e.g., a file system, database, data structure, or any other storage mechanism) for storing data. A repository may include multiple different, potentially heterogeneous, storage units and/or devices.

An artifact repository (102) is a repository that has software artifacts. For example, the artifact repository (102) may be one or more web servers or other devices that store software artifacts (i.e., artifact). An artifact is a collection of data and programming code that is used to develop other software programs. For example, artifacts may include configuration data, documentation, software code in the form of pre-written and compiled classes, values, and other software resources that may be used by target software. In one or more embodiments, the artifacts are open-source libraries, which may be distributed through centralized hubs of the artifact repositories (102).

The artifact repositories may have multiple artifacts. An artifact may have multiple classes. The term, "class", in the present application complies with the standard definition used in the art of object oriented programming. The copy of the same class, with or without modifications, may be in more than one artifact. The class may have the same name or a different name than the class in other artifacts. Thus, at least some of the classes may not uniquely identify an artifact amongst the multiple different artifacts. Further, the class may not identify the artifact from which the class was copied.

An artifact may have multiple versions (i.e., artifact version). Between versions of an artifact, different parts of the artifact may change, and different parts may be the same as in other artifact versions of the same artifact. For example, classes may be added, removed, modified between versions, while some of the classes may be the kept unmodified between versions. For example, the exact same class may be in one or more version of the artifact while other classes may have minor or major modifications made. A class version is a version of a class. When the class remains unchanged between artifact versions, then the class version is the same between the artifact versions. If the class is changed, then the class version is different between artifact versions. The modification that creates a new class version may be changing the name or changing the code of the class in one or more embodiments. In some embodiments, a changed name may not be considered a new class version.

The artifact version names, or names of the artifact versions, are unique. For example, the unique name may be formed of a triple having a group name, an artifact name, and a version identifier. The group name may be a name of a software group (e.g., company or department in a company, or other collection of developers) that develops the artifact. The artifact name is the unique identifier of the artifact within the group. The version identifier is the unique version identifier of the artifact version amongst the versions of the same artifact. Other naming schemes for artifacts may be used without departing from the scope of the claims.

Continuing with FIG. 1, target software (104) is configured to use one or more artifact repositories (102). Use may be based on a linkage or reference within the source code with the artifact in the artifact repository or direct copying of one or more classes of the artifact in the source code. Target software (104) is a program, enterprise software, or other collection of software that has at least a portion that is the target of analysis. Target software may be written in source code and compiled to binary code. Target software (104) may include one or more artifact versions of the same artifacts and one or more artifacts. With a complicated software development process, the target software (104) may include old versions of one or more artifacts. Further, the artifact and artifact versions may not be identifiable in the target software (104). For example, the computing system (not shown) having the target software (104) may only have the binary code format of at least the portion of the target software being analyzed.

The system in FIG. 1 may include a software management program (106). A software management program (106) is a program that performs at least one management task of the target software (104). For example, the software management program (106) may be configured to detect and address security vulnerabilities in target software (104). As another example, the software management program (106) may be a tool that updates software or provides recommendations for updating software. The software management program (106) is connected to a software component analysis program (108).

The software component analysis program (108) is a software tool that is configured to identify the artifact and, possibly, the artifact version in target software (104) based on a request having classes in the target software. The request includes binary code of one or more classes of at least one unknown artifact version or unknown artifact. In some embodiments, the request includes all binary code of the target software, including unknown artifacts. For example, the relationship between the class and the artifact may be removed based on repackaging (e.g., a developer, contrary to best practices, copying the class only) or classes are only be observed and sent for analysis during runtime loading. The software component analysis program (108) is connected to a fingerprint repository (110).

The fingerprint repository (110) includes fingerprint indexes (112). The fingerprint indexes (112) relate fingerprints to artifacts and artifact versions. As shown in FIG. 1, an artifact has a corresponding fingerprint index (e.g., artifact X fingerprint index (114), artifact Y fingerprint index (116)). From a data structure perspective, the various fingerprint indexes (112) may be combined into a single data structure or separated into multiple data structures. The use of multiple fingerprint indexes refers to a logical separation for explanation purposes.

A fingerprint is a unique identifier generated from a class version. Notably, a fingerprint is not necessarily a unique identifier of an artifact because fingerprints are created for a class (i.e., a particular version of the class) and a same unmodified class version may be in multiple artifacts and artifact versions. Generally, a fingerprint is performed as a function of the binary code of the class. For example, a fingerprint may be a cryptographic hash of the binary code. In some embodiments in which a preset portion of the class name may be changed while the remaining portion is unmodified, the function to generate the fingerprint may explicitly ignore the portion that may be changed. Although fingerprints in the fingerprint repository (110) are generated from corresponding individual classes versions, fingerprints are related in the fingerprint repository to the artifact and, possibly, the artifact version. Fingerprints in the fingerprint repository are not related to the class version or the class. Stated another way, although a class is used to create the fingerprint, the relationship between the fingerprint and the class is excluded, or otherwise disassociated, from the fingerprint repository such that the particular class for which a fingerprint is created cannot be identified by the fingerprint indexes (112). Fingerprints in a fingerprint repository may be referred to as indexed fingerprints. Fingerprints that are based on classes sent in a request for component analysis may be referred to as request fingerprints.

Returning to the software component analysis program (108), the software component analysis program (108) is configured to generate fingerprints and use fingerprints to analyze portions of target software. The software component analysis program (108) includes a fingerprint generator (118), a repository constructor (120), an interface (122), and a component detector (124). The fingerprint generator (118) is a software component that implements the function, described above, to generate a fingerprint on a class or a predefined portion of the class. For example, the fingerprint generator (118) may implement a cryptographic hash function. In one or more embodiments, the same fingerprint generator (118) is used to generate fingerprints from the artifact repositories (102) as to generate fingerprints from portion of the target software (104). Thus, if the portion of the target software that is sent in a request uses a class in the artifact repository, the corresponding fingerprints will match.

The repository constructor (120) is a software component that is configured to generate a fingerprint repository (110). The repository constructor (120) includes one or more filters (126) and a fingerprint repository builder (128).

A filter (126) is configured to filter classes of the artifacts in the artifact repository for not including in the fingerprint repository. In one or more embodiments, the filtering is based on the degree of exclusivity of the classes amongst the artifacts and the artifacts versions of an artifact. In one or more embodiments, at least two thresholds exist, a class threshold and a version threshold. A class threshold is a threshold on the number of different artifacts in which a same unmodified class may be located. For example, the class threshold may be one. In the example, if the class is not unique to the artifact, then the class is not used in the fingerprint repository to identify a identify the artifact. In another example, the class threshold may be a percentage on the number of artifacts having the class. A version threshold is a threshold on the number of versions of an artifact in which the class is located. For example, the version threshold may be a percentage of the number of artifact versions having the class. The version threshold determines whether the fingerprint of the class is associated with the artifact or the artifact version.

The fingerprint repository builder (128) is configured to populate the fingerprint indexes with fingerprints related to artifacts and artifact versions. The fingerprint repository builder (128) uses the fingerprint generator (118) to generate fingerprints and relate the fingerprints to artifacts and artifact versions.

Continuing with the software component analysis program (108) includes an interface (122) and a component detector (124). The interface (122) may be an application programming interface (API) or a user interface (UI) for receiving requests to identify artifacts and artifact versions from classes belonging to unknown artifacts and artifact versions. The interface is further configured to respond to the requests. The component detector (124) is configured to identify the artifact and the artifact version, if possible, for classes in the request. For example, the component detector (124) may be configured to extract the classes from the request, request a fingerprint for each class from the fingerprint generator (118), query the fingerprint repository (110) with the fingerprint, and present matching artifacts and artifact versions. Because a same class version may be in multiple artifacts and artifact versions, the component detector (124) may applies an algorithmic approach to determining the matching artifact and artifact version. For example, the approach may be to present the artifact version having a maximal number of matching classes in the request. In some cases, an artifact version is not identified as matching. In such a scenario, the component detector may identify an artifact. In order to perform the match, fingerprints are defined on two levels of granularity.

FIG. 2 shows a diagram of the two levels of granularity of artifact fingerprints (200), artifact level and artifact version level. The artifact fingerprints (200) correspond to artifact fingerprints (artifact X fingerprint index (114), artifact Y fingerprint index (116)) in FIG. 1 in accordance with one or more embodiments. FIG. 2 shows the two levels of granularity for an artifact. In a first level, an artifact level fingerprint index (202) may exist. The artifact level fingerprint index (202) relates fingerprints to an individual artifact as a whole, but not to individual versions of the artifact. Specifically, the artifact level fingerprint index (202) includes, for each fingerprint, link to the unique identifier of the artifact that has the class version for which the fingerprint is created. The artifact level fingerprint index (202) includes fingerprints for class versions that are general across multiple artifact versions, such as to either not identify a particular artifact version or to be so general that storage and lookup time outweighs the advantage associated with identifying the artifact version using the class. Thus, the classes correspond to the fingerprints in the artifact level fingerprint index (202) are excluded from being represented in the version level fingerprint index (204).

The version level fingerprint index (204) is at the second level of granularity. The second level of granularity relates fingerprint to individual artifact versions. For example, artifact version M identifier (206) is related to version level indexed fingerprints (210) for artifact version M. Similarly, artifact version identifier N (208) is related to version level indexed fingerprints (212) for artifact version N. The indexed fingerprints in version level indexed fingerprints (210) for artifact version M may overlap with the version level indexed fingerprints (212) for artifact version N. Namely, because a same class version may be in multiple artifact versions, the indexed fingerprints in artifact versions of an artifact are not unique amongst the artifact versions.

Figure 4:
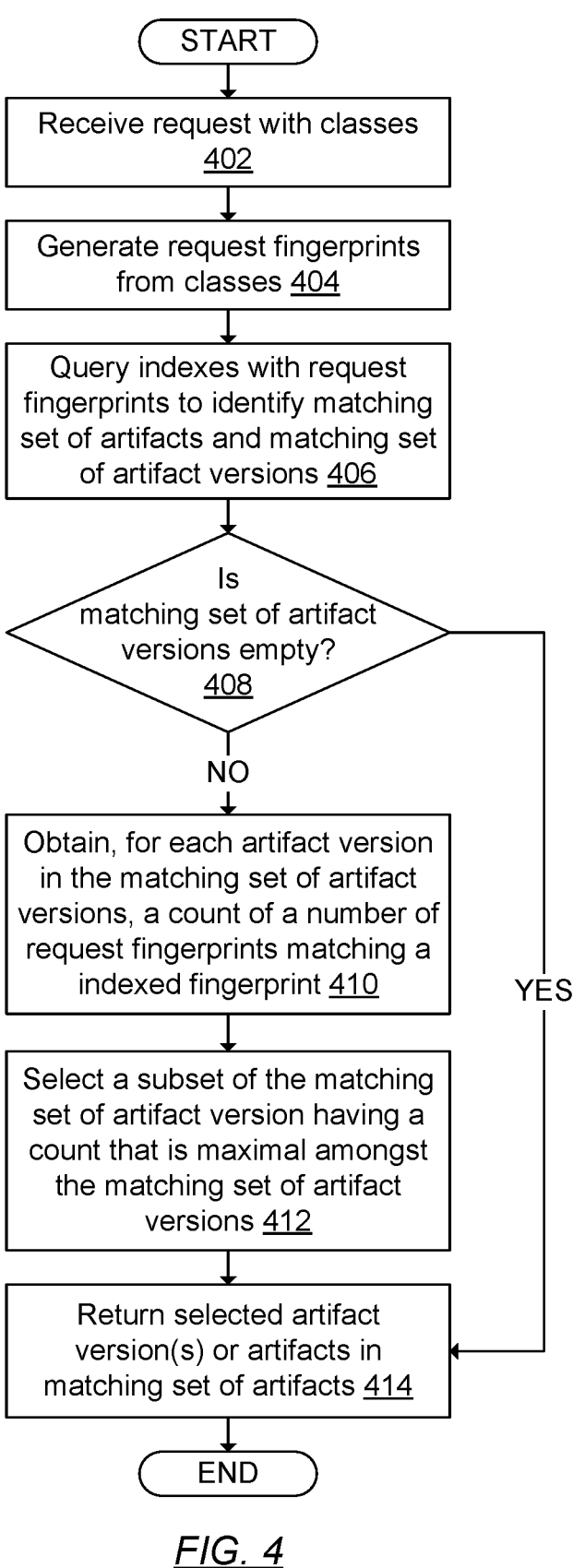
FIG. 4 is a flowchart for using a fingerprint repository in accordance with one or more embodiments.

FIGS. 3 and 4 show flowcharts in accordance with one or more embodiments. While the various steps in these flowcharts are presented and described sequentially, at least some of the steps may be executed in different orders, may be combined, or omitted, and at least some of the steps may be executed in parallel. Furthermore, the steps may be performed actively or passively.

FIG. 3 is a flowchart for storing and generating fingerprints in a fingerprint repository in accordance with one or more embodiments. In Block 302, a set of classes related to artifacts and artifact versions are obtained. The repository constructor accesses an artifact repository to obtain the artifacts, and, in particular, the classes of each artifact. The classes in the set may be class versions in as many artifacts and artifact versions of the artifacts in the artifact repository. New artifacts and artifact versions may be added after an initial building of the repository. At this stage, the obtaining may be of the identifiers of the class version related to the corresponding artifact version name of the artifact version having the class version. The binary code for the classes may be obtained at this stage or at a later stage (e.g., when generating fingerprints).

In Block 304, the set of classes is filtered based on a class threshold of the number of artifacts in which each class is located to obtain the set of filtered classes related to artifacts.

The class threshold is on the number or percentage of artifacts, rather than individual versions of artifacts, that have a particular class version. The filtering in Block 304 is an initial stage filtering to ignore classes that common across multiple artifacts. In some embodiments, the class threshold is one. In such embodiments, the test in Block 304 for whether to filter out the class is whether a particular class version is unique to an artifact.

The filtering may be performed by, for each class, performing a comparison of a number of the artifacts having the class with a class threshold. The result of performing the comparison for each class is a set of filtered classes. The comparison may be a name based comparison. Specifically, the name based comparison is comparing the name of the class across the artifacts. As another example, the filtering may be performed by generating fingerprints for the class versions and determining whether the number of instances of each fingerprint across the artifacts satisfies the class threshold. Satisfying the class threshold means that the number is less than the class threshold. In some embodiments, satisfying further means is less than or equal to the class threshold. If the number satisfies the class threshold, then the fingerprint class is kept in the set of filtered aspect. If the number of instances fails to satisfy (e.g., is greater than or is greater than or equal to) the class threshold, then the class is removed from the set of classes and is not in the set of filtered classes.

In Block 306, fingerprints for the classes in the set of filtered classes is generated. The generation of the fingerprints may be performed as part of Block 304 or may be performed after Block 304. To generate the fingerprints, the binary code of the class version is obtained. The fingerprint generator executes using the binary code as input to the fingerprinting function, such as the hash function on the binary code. The output of the fingerprint generator is the fingerprint that is unique to the class version. The fingerprint is associated with the class version and the artifact version name.

In Block 308, the fingerprints are related to the corresponding artifact or corresponding artifact version(s) according to version threshold. The result of Block 308 is to obtain indexes relating indexed fingerprints to artifact or artifact version. The version threshold is a threshold on whether the fingerprint is common across multiple versions of the same artifact. For each class (e.g., class version) in the set of filtered classes, a comparison of a number of artifact versions having the class is compared with a version threshold. A determination is made whether the number of artifact versions having the class satisfies the version threshold. The number satisfies the version threshold when the number of artifact versions is less than, or in some implementations, less than or equal to the version threshold. If the fingerprint satisfies the version threshold, then the fingerprint is added as an indexed fingerprint to the artifact version level fingerprint index for the particular artifact version. If the number fails to satisfy (e.g., is greater than or is greater than or equal to) the version threshold, then the fingerprint is deemed common across multiple versions. In such a scenario, the fingerprint is added as an indexed fingerprint to the artifact level fingerprint index for the artifact. At this stage, when generating the indexes, the class name and class version may be excluded from the index. Thus, only the artifact and artifact versions are related to the corresponding indexed fingerprints in the indexes.

In Block 310, the indexes are stored in the fingerprint repository. Indexes may be updated, after storage, as new artifacts are added.

FIG. 4 is a flowchart for using a fingerprint repository in accordance with one or more embodiments. In Block 402 of FIG. 4, a request with classes is received. The request includes a code section that has at least a portion of binary code of target software. Multiple classes may be in the request.

In Block 404, request fingerprints are generated from the classes. The request fingerprints are generated from the binary code of the classes. Generating the request fingerprints is performed in the same way as generating the indexed fingerprints, discussed above with reference to Block 306 of FIG. 3.

In Block 406, the indexes are queried with the request fingerprints to identify a matching set of artifacts and a matching set of artifact versions. The request fingerprints are used as a lookup into the indexes. The result includes a matching set of artifacts that have indexed fingerprints being the same as the request fingerprints. For each artifact in the matching set of artifacts, a count is maintained of the number of indexed fingerprints that match a request fingerprint. The matching set of artifacts may have zero or more matching artifacts. The result of Block 406 may also include a matching set of artifact versions that have indexed fingerprints being the same as the request fingerprints. For each artifact version in the matching set of artifact versions, a count is maintained of the number of indexed fingerprints that match a request fingerprint. The matching set of artifact versions may have zero or more matching artifact versions and may or may not be a version of the same artifact.

In some embodiments, an assumption is made that target software includes only one version of an artifact. However, the single version constraint may be relaxed selectively, such as only for artifacts for which there is evidence of multiple versions. Evidence for multiple versions may be found, for example, when an orthogonal software component analysis is performed using metadata. The inference database can also provide evidence itself (e.g., a slightly modified lookup algorithm matches at least two fingerprints, which are unique to distinct versions of the same library). If evidence exists, the single version constraint is dropped for the library without loss of precision. Similarly, fingerprints of the same class with different names at the same time may be evidence for more than one version of a library being present in the lookup set. In such a scenario, the system may return multiple versions.

In Block 408, a determination is made whether the matching set of artifact versions is empty. If the matching set of artifact versions is empty, then no artifact version level fingerprint index has an indexed artifact that is the same as at least one of the request artifacts. In such a scenario, the system may return the artifacts in the matching set of artifacts in Block 414. For example, the system may return a list having project names and artifact names for each artifact in the matching set of artifacts.

If the matching set of artifact versions is determined not empty in Block 408, the flow proceeds to Block 410. In Block 410, for each artifact version in the matching set of artifact versions, a count of a number of request fingerprints matching an indexed fingerprint. The count may be obtained from the matching set of artifact versions or by performing separate count. In Block 412, the subset of the matching set of artifact versions having a count that is maximal amongst the matching set of artifact versions is selected. The system identifies the one or more artifact versions having maximal count amongst the artifact versions. The result is a selected subset of artifact versions.

In Block 414, the selected artifact versions or the matching set of artifacts are returned. For example, the selected artifact versions or the matching set of artifacts may be supplied as output to the software manager program. The artifacts or artifact versions that are returned are determined to be components of the binary code in the request. Thus, the software manager program may use the information to manage the target software. For example, by performing a comparison of the artifact version and artifacts with a vulnerability repository listing security vulnerability of artifacts, the software manager program may detect security vulnerabilities in target software. The software manager program may further recommend or update the target software to use a newer version of the artifact or a different artifact.

In enterprise software where many different developers work on the same software product over many years, the components of the software product may not be knowable without performing a component analysis. For example, one of the many developers may simply copy one or more classes into the target software from a public repository of open source code and then leave the enterprise software company. Similarly, other developers may use their favorite libraries before moving onto other projects. New developers and managers on the project need to know the components of the enterprise software in order to update the software as new technology develop and to remove security vulnerabilities. One or more embodiments create a technique to determine the components, even when not evident, and perform the update.

The following example is for explanatory purposes only and not intended to limit the scope of the invention.

Figure 5:
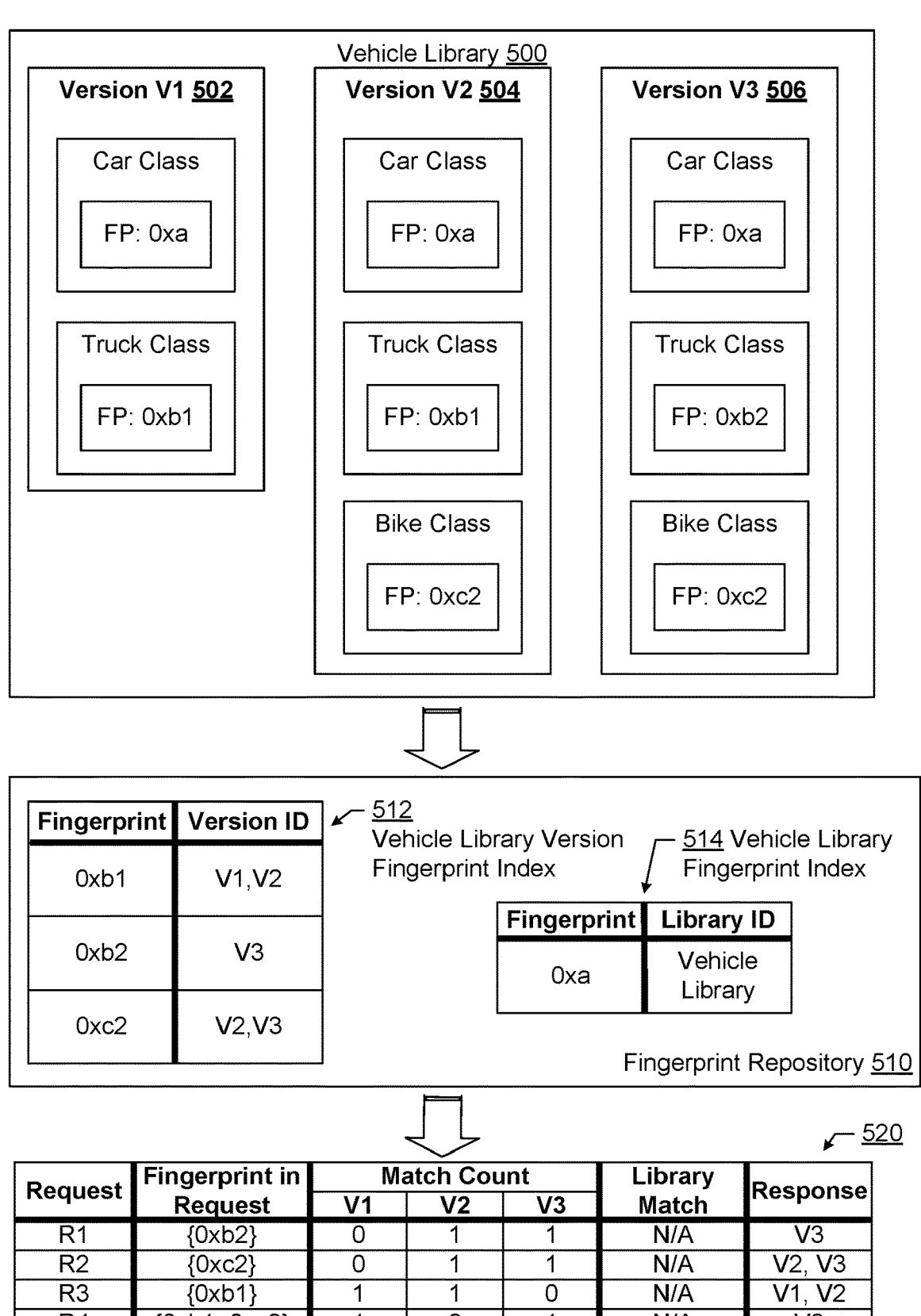
FIG. 5 shows an example in accordance with one or more embodiments.

FIG. 5 shows an example in accordance with one or more embodiments. In the example of FIG. 5, fingerprint is denoted by "FP" and version is denoted by "V" with a version number. As a simple example shown in FIG. 5, consider that the example of a vehicle library (500), which has been released in three versions Version V1 (502), Version V2 (504), and Version V3 (506). Within the library, is binary code and, potentially, source code that is not shown. Between the versions, the car class is never changed, and, thus, it has the same fingerprint (fp: 0xa) across all versions of the vehicle library (500). The truck class changes in v3 and the bike class is introduced in V2 and does not change thereafter.

For the vehicle library (500), the fingerprint repository (510) is generated and has a vehicle library version fingerprint index (512) and a vehicle library fingerprint index (514). The vehicle library version fingerprint index (512) relates indexed fingerprints to version identifiers of the vehicle library. Thus, vehicle library version fingerprint index (512) is at the version level of granularity. The vehicle library fingerprint index (514) relates the vehicle library to the fingerprint.

Because the car class fingerprint appears in every version of the library and does not contribute to inference, the car class fingerprint is not added the fingerprints of vehicle library version fingerprint index (512). However, assuming that the car class is unique to the vehicle library and the inference is performed across multiple libraries, the fingerprint for the car classes is added to the vehicle library fingerprint index. Other classes that are common across multiple libraries may be excluded from storage. The remaining classes satisfy a version threshold of versions in which the version of the class may be found. In the example, the version threshold may be 75%.

Continuing with FIG. 5, each row in Table (520) corresponds to a unique request (denoted as R1-R5) to the software component analysis program. The first column of the table is an identifier of the request. The second column lists the request fingerprints in the request. The third column, having three sub-columns, list the number of matches for each version. The fourth column lists whether the fingerprint is in the vehicle library fingerprint index. The fifth column is the response that is returned to the request.

The first request, R1, is trivial since 0xb2 is a unique fingerprint, there is a single match of version V3. Thus, V3 is returned. The next two requests (R2 and R3) both have two single matches in two different versions. The results are less precise. However, at least the number of possible versions are narrowed down. Thus, the response for R2 is a matching set having V2 and V3, which both have a maximal count. The response for R3 is a matching set having versions V1 and V2. R4 is the case in which both classes as in R2 and R3 are used at the same time. In such a scenario, a selected set has version V2 with the single maximal match count. Thus, V2 is returned. In R5, the lookup has fingerprint 0xa, which is not in the vehicle library version fingerprint index. 0xa is in the vehicle library fingerprint index, and thus, the vehicle library name is returned.

For each of the above requests R1-R4, the fingerprint 0xa can be added to the lookup set without changing the matching counts and thus results. Furthermore, also if we had added 0xa to the lookup index (by setting t to the maximum value 1), the results still do not change. This is because the invariant fingerprint of class car has no discriminatory power between versions of the library.

Figure 6A:
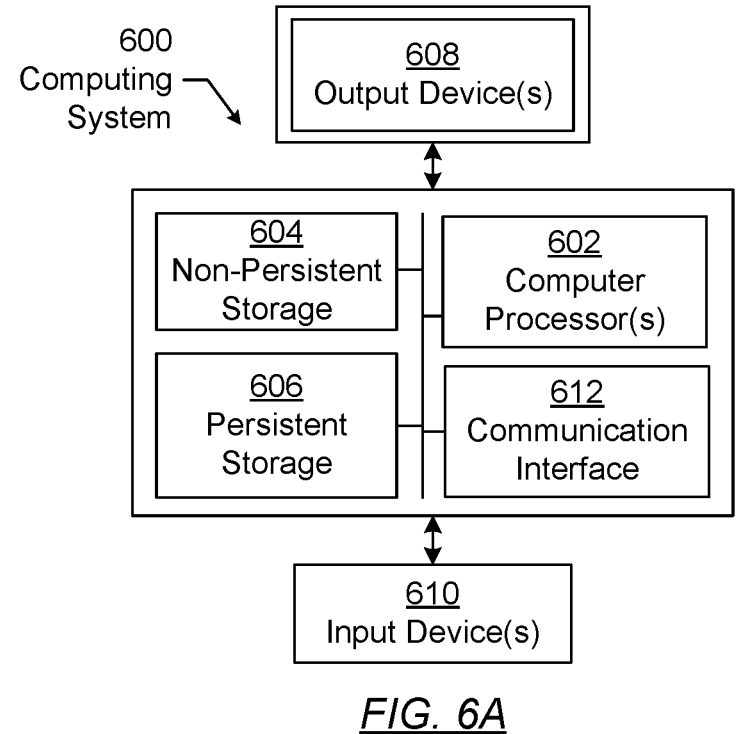
FIGS. 6A and 6B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. For example, the computer processor(s) may be one or more cores or micro-cores of a processor. The input devices (610) may include a touchscreen, keyboard, mouse, microphone, touchpad, electronic pen, or any other type of input device. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
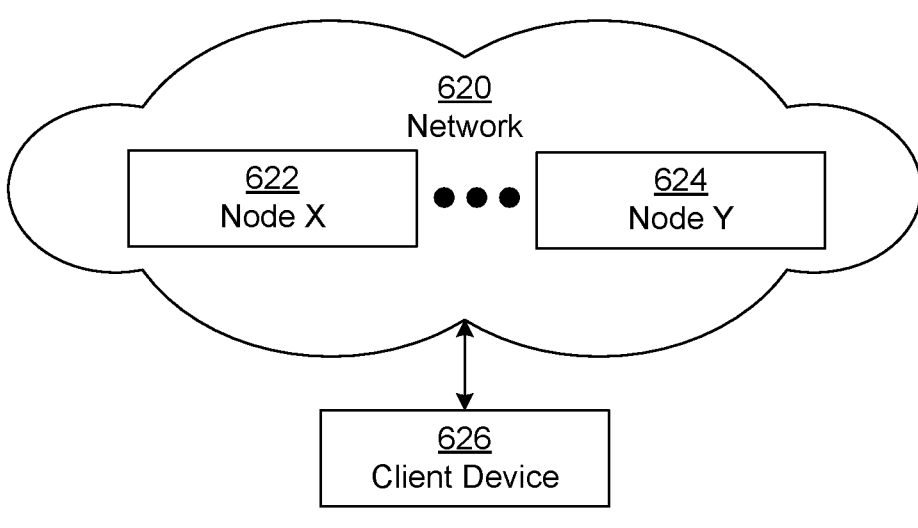

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:

receiving a first request comprising a first plurality of classes;

executing instructions, stored in memory, on a computer processor to generate a first plurality of request fingerprints from the first plurality of classes;

executing instructions, stored in memory, on a computer processor to query at least one index with the first plurality of request fingerprints to identify a first matching set of artifact versions;

obtaining, for each matching artifact version in the first matching set of artifact versions, a count of the first plurality of request fingerprints matching an indexed fingerprint related, in the at least one index, to the artifact version;

executing instructions, stored in memory, on a computer processor to select a subset of the first matching set of artifact versions having a count that is maximal amongst the first matching set of artifact versions; and returning the subset of the first matching set of artifact versions.

2. The method of claim 1, further comprising:

receiving a second request comprising a second plurality of classes;

generating a second plurality of request fingerprints from the second plurality of classes;

querying the at least one index with the second plurality of request fingerprints to identify a second matching set of artifact versions and a matching set of artifacts;

making a determination that the second matching set of artifact versions is empty; and returning the matching set of artifacts based on the determination.

3. The method of claim 1, further comprising:

obtaining, for a plurality of artifacts comprising a plurality of artifact versions, a third plurality of classes;

generating a plurality of fingerprints for the third plurality of classes; and indexing the plurality of fingerprints in the at least one index to obtain a plurality of indexed fingerprints.

4. The method of claim 3, further comprising:

filtering the third plurality of classes based on a comparison, for each class in the third plurality of classes, a number of the plurality of artifacts having the class with a class threshold to obtain a plurality of filtered classes, wherein generating the plurality of fingerprints using the third plurality of classes is performed for the plurality of filtered classes.

5. The method of claim 4, wherein the class threshold is one.

6. The method of claim 3, further comprising:

performing, for a class of the third plurality of classes, a comparison of a number of artifact versions having the class with a version threshold; and adding the indexed fingerprint in the plurality of fingerprints to an artifact version level fingerprint index of the at least one index based on the comparison indicating that the number satisfies the version threshold, wherein the indexed fingerprint is related to each artifact version having the class in the artifact version level fingerprint index.

7. The method of claim 6, further comprising:

adding the indexed fingerprint in the plurality of fingerprints to an artifact level fingerprint index of the at least one index based on the comparison indicating that the number fails to satisfy the version threshold, wherein the indexed fingerprint is related to an artifact having the class in the artifact level fingerprint index.

8. The method of claim 1, further comprising:

detecting a set of vulnerabilities of the subset of the first matching set of artifact versions; and responding to the first request with the set of vulnerabilities.

9. A system comprising:

a fingerprint repository comprising at least one index; and a software component analysis program executing on a computer processor comprising:

an interface for:

receiving a first request comprising a first plurality of classes, and returning a subset of a first matching set of artifact versions, a fingerprint generator for generating a first plurality of request fingerprints from the first plurality of classes, and a component detector for:

querying at least one index in the fingerprint repository with the first plurality of request fingerprints to identify the first matching set of artifact versions, obtaining, for each matching artifact version in the first matching set of artifact versions, a count of the first plurality of request fingerprints matching an indexed fingerprint related, in the at least one index, to the artifact version, and selecting the subset of the first matching set of artifact versions having a count that is maximal amongst the first matching set of artifact versions.

10. The system of claim 9, wherein the interface is further for:

receiving a second request comprising a second plurality of classes, and returning a matching set of artifacts based on a determination, the fingerprint generator is further for generating a second plurality of request fingerprints from the second plurality of classes, the component detector is further for:

querying the at least one index in the fingerprint repository with the second plurality of request fingerprints to identify a second matching set of artifact versions and a matching set of artifacts, and making the determination that the second matching set of artifact versions is empty.

11. The system of claim 9, further comprising:

a repository constructor for:

obtaining, for a plurality of artifacts comprising a plurality of artifact versions, a third plurality of classes, wherein the fingerprint generator is further for generating a plurality of fingerprints for the third plurality of classes; and the repository constructor comprising a fingerprint repository builder for indexing the plurality of fingerprints in the at least one index to obtain a plurality of indexed fingerprints.

12. The system of claim 11, wherein the repository constructor further comprises:

a filter for filtering the third plurality of classes based on a comparison, for each class in the third plurality of classes, a number of the plurality of artifacts having the class with a class threshold to obtain a plurality of filtered classes, wherein generating the plurality of fingerprints using the third plurality of classes is performed for the plurality of filtered classes.

13. The system of claim 12, wherein the class threshold is one.

14. The system of claim 11, wherein the repository constructor further comprises:

a filter for performing, for a class of the third plurality of classes, a comparison of a number of artifact versions having the class with a version threshold, wherein the fingerprint repository builder is further for adding the indexed fingerprint in the plurality of fingerprints to an artifact version level fingerprint index of the at least one index based on the comparison indicating that the number satisfies the version threshold, and wherein the indexed fingerprint is related to each artifact version having the class in the artifact version level fingerprint index.

15. The system of claim 14, wherein the fingerprint repository builder is further for:

adding the indexed fingerprint in the plurality of fingerprints to an artifact level fingerprint index of the at least one index based on the comparison indicating that the number fails to satisfy the version threshold, wherein the indexed fingerprint is related to an artifact having the class in the artifact level fingerprint index.

16. The system of claim 9, further comprising:

a software manager program for:

detecting a set of vulnerabilities of the subset of the first matching set of artifact versions; and responding to the first request with the set of vulnerabilities.

17. A non-transitory computer readable medium comprising computer readable program code for causing a computing system to perform operations comprising:

receiving a first request comprising a first plurality of classes;

generating a first plurality of request fingerprints from the first plurality of classes;

querying at least one index with the first plurality of request fingerprints to identify a first matching set of artifact versions;

obtaining, for each matching artifact version in the first matching set of artifact versions, a count of the first plurality of request fingerprints matching an indexed fingerprint related, in the at least one index, to the artifact version;

selecting a subset of the first matching set of artifact versions having a count that is maximal amongst the first matching set of artifact versions; and returning the subset of the first matching set of artifact versions.

18. The non-transitory computer readable medium of claim 17, wherein the operations further comprise:

receiving a second request comprising a second plurality of classes;

generating a second plurality of request fingerprints from the second plurality of classes;

querying the at least one index with the second plurality of request fingerprints to identify a second matching set of artifact versions and a matching set of artifacts;

making a determination that the second matching set of artifact versions is empty; and returning the matching set of artifacts based on the determination.

19. The method of claim 1, wherein the first plurality of classes is in binary code.

20. The system of claim 9, wherein the first plurality of classes is in binary code.

\* \* \* \* \*